Patented Feb. 20, 1951

2,542,349

UNITED STATES PATENT OFFICE 2,542,349

CALCIUM SILICATE PHOSPHOR

Jan Lourens Ouweltjes, Eindhoven, Netherlands, assignor to General Electric Company, a corporation of New York No Drawing. Application February 3, 1949, Serial No. 74,463. In the Netherlands August 5, 1948

2 Claims. (Cl. 252—301.4)

My invention relates to luminescent materials or phosphors useful for lighting when employed in conjunction with a source radiation which excites the materials to luminescence.

In order to properly understand the invention, attention is invited to the known fact that calcium metasilicate can crystallize in two modifications, which are the wollastonite and the pseudo-wollastonite structures. When the silicate is prepared by heating calcium oxide and silicon dioxide or calcium carbonate and silicon dioxide at a temperature above 1200° C., the pseudo-wollastonite structure will result; below 1200° C., the wollastonite structure will result.

It is already known that calcium metasilicate activated with manganese and lead and having a wollastonite structure can be excited by short-wave ultraviolet rays (2537 Å.) to emit rays which are located partially in the orange-red and partially in the ultraviolet part of the spectrum (between 2800 Å. and 4000 Å.). The substance with the pseudo-wollastonite structure also luminesces under the same excitation; however, the luminescence is of such a low intensity that this substance is not practical.

It may be noted also that the temperature of preparation of this lead and manganese activated calcium metasilicate with wollastonite structure is about 1000° to 1250° C. That the heating may be higher than the above-mentioned transition temperature (1200° C.) is due to the fact that the transition temperature between the wollastonite and the pseudo-wollastonite structure is raised somewhat by the manganese (the addition of lead has practically no influence on the location of the transition point).

According to the present invention, the luminescent material consists of a manganese and cerium-activated calcium metasilicate having the pseudo-wollastonite structure. It is particularly useful in combination with a gaseous electric discharge tube, especially a mercury vapor discharge tube.

Investigations which led to the invention showed that this calcium metasilicate can produce a good, useful luminescence. In contrast to the known calcium metasilicate which is activated with manganese and lead, the manganese and cerium activated calcium metasilicate must possess the pseudo-wollastonite structure. The wollastonite structure does not give luminescence of practical use. The material comprising the invention emits two bands, one in the blue and one in the yellow part of the spectrum. The bands have intensities of the same order of magnitude. The relative proportion can be varied somewhat by varying the proportion of the manganese content with respect to the cerium content.

In general it is desirable to obtain practically white light, for which purpose the manganese content must be about equal to the cerium content expressed in mol percents; preferably both percentages are between 2 and 10 mol percent calculated from the total quantity of calcium oxide.

One of the very great advantages of the manganese and cerium activated calcium metasilicate is that the excitation can take place with rays of wave length 2537 Å. as well as with rays of wave length 3650 Å. The material may be used in combination with a high pressure as well as with a low pressure mercury vapor discharge tube. When excited with 2537 Å. the quantum efficiency is so high that the light radiation is practically equal to that of the currently used mixtures of silicates and tungstates which emit light of the same color. In comparison with these mixtures the great advantage exists that the white color is obtained with a single luminescent material.

To produce a luminescent material in accordance with a method which is also part of this invention, a mixture of the oxides of calcium, silicon, cerium, and manganese or substances which are decomposable by heating to yield these oxides, is heated in a non-oxidizing, and preferably, a reducing atmosphere at a temperature at which the pseudo-wollastonite structure is developed. The correct temperature is somewhat dependent on the manganese content. This is related to the fact that the location of the transition temperature between the wollastonite and the pseudo-wollastonite structure depends on the quantity of manganese, just like that of the known calcium metasilicate with manganese and lead. The reducing atmosphere can, for example, consist of a mixture of nitrogen and hydrogen. As materials which will produce the above-mentioned oxides when heated, carbonates and nitrates may be mentioned.

For a further understanding of the invention the following example is given:

96 gr. calcium carbonate
2.3 gr. manganese carbonate
5.5 gr. cerium carbonate $(Ce_2(CO_3)_3 \cdot 5H_2O)$ are mixed with a quantity of silicic acid corresponding to 61 gr. water free $SiO_2$. This mixture is ground for one hour in a mortar filled with acetone. After this mixture is filtered off on a Buchner funnel, the mixture is dried and then fired for two hours at 1400° C. in an electric furnace through which a mixture of nitrogen and hydrogen is conducted.

One can also start with solutions of the different metals in the desired proportions; for example, chlorides or nitrates. To these one adds an excess of an ammonium carbonate solution, causing a thorough mixture of the three carbonates. This is then mixed with silicic acid and processed further in the above-mentioned method.

The basic substances used must be very pure as is always the case in the preparation of luminescent substances, and it is of advantage to start with very fine materials.

What I claim as new and desire to secure by Letters Patent of the United States is:

1. A luminescent material consisting essentially of calcium metasilicate activated by manganese and cerium and having the pseudo-wollastonite structure, the manganese and cerium contents each being about 2 mol percent to about 10 mol percent of the calcium oxide content.

2. A luminescent material consisting essentially of calcium metasilicate activated by manganese and cerium and having the pseudo-wollastonite structure, the manganese and cerium contents being about equal and each being about 2 mol percent to about 10 mol percent of the calcium oxide content.

JAN LOURENS OUWELTJES.

REFERENCES CITED

The following references are of record in the file of this patent:

UNITED STATES PATENTS

| Number | Name | Date |
| --- | --- | --- |
| 2,299,510 | Steadman | Oct. 20, 1942 |

OTHER REFERENCES

Kroger: "Some Aspects of the Luminescence of Solids," (Publication) 1948, page 288.